US006159605A

United States Patent [19]

Hanada et al.

[11] Patent Number: 6,159,605

[45] Date of Patent: Dec. 12, 2000

[54] INK-JET RECORDING SHEET

[75] Inventors: Kazuyuki Hanada; Katsutoshi Torii; Takeshi Kawaguchi; Katsuyuki Fukui; Motoaki Umezu, all of Tokyo, Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 09/017,705

[22] Filed: Feb. 5, 1998

[30] Foreign Application Priority Data

Feb. 18, 1997 [JP] Japan .................................... 9-048579
Feb. 18, 1997 [JP] Japan .................................... 9-048580

[51] Int. Cl.[7] ...................................................... B32B 27/00

[52] U.S. Cl. ....................... 428/423.1; 428/195; 428/447; 428/474.4

[58] Field of Search .................................... 428/195, 500, 428/423.1, 447, 474.4

[56] References Cited

U.S. PATENT DOCUMENTS

| | | | |
|---|---|---|---|
| 3,968,278 | 7/1976 | Wells | 428/258 |
| 4,613,525 | 9/1986 | Miyamoto et al. | 427/256 |
| 5,384,365 | 1/1995 | Hanada et al. | 525/105 |

*Primary Examiner*—Bruce H. Hess
*Assistant Examiner*—Michael Grendzynski
*Attorney, Agent, or Firm*—Oblon, Spivak, McClelland, Maier & Neustadt, P.C.

[57] ABSTRACT

An ink-jet recording sheet is provided with at least one ink-receiving layer on at least one side of a base material sheet. A resin component which constitutes the ink-receiving layer comprises a hydrophilic polyurethane resin, hydrophilic polyurea resin, hydrophilic polyurethane-polyurea resin or hydrophilic polyamide resin having siloxane segments in a molecule thereof. As an alternative, the ink-receiving layer comprises a porous hydrophilic polyurethane resin, a porous hydrophilic polyurea resin or a porous hydrophilic polyurethane-polyurea resin.

10 Claims, No Drawings

INK-JET RECORDING SHEET

BACKGROUND OF THE INVENTION a) Field of the Invention

This invention relates to an ink-jet recording sheet, and especially to an ink-jet recording sheet having an ink-receiving layer which is excellent especially in the absorbency of a water-based ink, can provide stable printed characters, picture, pattern or the like (hereinafter collectively called "printed marks" for the sake of brevity) of high quality, and is also superb in transportability, blocking resistance, waterproofness and moisture resistance.

b) Description of the Related Art

Ink-jet recording is to perform recording of an image, characters or the like by causing tiny droplets of an ink to fly and stick on a recording sheet made of paper or the like. Various operation principles have been proposed including, for example, the electrostatic attraction method, the method that mechanical vibrations or displacements are applied to an ink by means of a piezoelectric element, and the method that an ink is heated to bubble and the resulting pressure is used. As a recording method which permits high-speed recording, produces less noise and enables high-quality printing and multicolor printing, ink-jet recording is finding ever-increasing utility for various applications.

For use in such ink-jet recording, various recording sheets have been proposed, including recording sheets provided on paper or like bases with ink-receiving layers, which are composed primarily of various pigments and resins, or recording sheets containing porous pigments incorporated in themselves upon making paper so that prompt absorption of ink and formation of well-defined ink dots can be assured without a reduction in print quality due to blotting and/or bleeding of the ink adhered on the recording sheets.

For example, JP Kokai No. 57-82085 discloses to provide an ink-receiving layer composed of a water-soluble polymer in combination with both an inorganic pigment and an organic pigment as pigments, and JP Kokai No. 62-268682 discloses to provide an ink-receiving layer composed of fine powdery silica and a polyvinyl alcohol copolymer containing silanol groups.

However, keeping the step with improvements in the performance of ink-jet recording machines, such as high-speed recording, high-density recording and full-color recording, and the resulting expansion of their application fields, it has also become necessary for ink-jet recording sheets to have high-level characteristics such as:

(1) Prompt ink absorption and large ink absorption capacity.

(2) High color-producing ability for inks.

(3) High surface strength on the ink-receiving layer.

(4) High waterproofness of the base material so that the base material will not develop roughness or curling by an ink.

(5) Good mark storability, such as waterproofness and ozone resistance, after printing of marks on the ink-receiving layer.

(6) No quality changes of the ink-receiving layer along the passage of time.

To meet these requirements, it has been proposed or studied to use a porous pigment or water-soluble polymer having excellent ink absorbency as a component of an ink-receiving layer to be placed on an ink-jet recording sheet, to use a latex for an improvement in the waterproofness of an ink-receiving layer, and to use as a base material itself a synthetic paper sheet, plastic sheet or the like equipped with waterproofness.

However, those making use of paper as a base material or a water-soluble polymer alone as an ink-receiving layer have poor waterproofness so that blotting takes place at printed parts and printed marks are hence inferior in definition. On the other hand, those making use of a synthetic paper sheet or plastic film as a base material and those making use of a latex as a resin in an ink-receiving layer involve problems in the adhesion between the ink-receiving layer and the base material and in ink absorbency and ink drying property.

SUMMARY OF THE INVENTION

An object of the present invention is to provide an ink-jet recording sheet having an ink-receiving layer, which is excellent especially in the absorbency of a water-based ink, can form ink dots of well-defined contours, is excellent in the color-producing ability for inks, can provide stable printed marks of high quality, and is also superb in transportability, blocking resistance, waterproofness and moisture resistance.

The above object of the present invention has been achieved by the present invention. Accordingly, there is provided, in one aspect of the present invention, an ink-jet recording sheet provided with at least one ink-receiving layer on at least one side of a base material sheet, wherein a resin component which constitutes the ink-receiving layer comprises a hydrophilic polyurethane resin, hydrophilic polyurea resin, hydrophilic polyurethane-polyurea resin or hydrophilic polyamide resin having siloxane segments in a molecule thereof.

In another aspect of the present invention, there is also provided an ink-jet recording sheet provided with at least one ink-receiving layer on at least one side of a base sheet, wherein the ink-receiving layer comprises a porous hydrophilic polyurethane resin, a porous hydrophilic polyurea resin or a porous hydrophilic polyurethane-polyurea resin.

In general, the resolution of printed marks on an ink-jet recording sheet is dependent upon the absorbed quantity of an ink. Excessively high ink absorbency will lead to a reduction in the density of printed marks and also to reductions in their definition and color-producing ability, so that the printed marks will be inferior in resolution.

Unduly low ink absorbency, on the other hand, is accompanied by drawbacks such as a reduction in the quality of printed marks due to irregularity in print density and blotting and the need for a longer ink-drying time, although the printed marks have a higher density.

To solve the above-described problems of the conventional ink-jet recording sheets, the present inventors have proceeded with a variety of investigations. As a result, it has been found that the adoption of a specific constitution for an ink-receiving layer makes it possible to obtain an ink-jet recording sheet having an ink-receiving layer, which is excellent in the absorbency of a water-based ink, can form ink dots of well-defined contours, is excellent in the color-producing ability for inks, can provide stable printed marks of high quality, and is also superb in transportability, blocking resistance, waterproofness and moisture resistance.

Basically speaking, an introduction of water-repellant siloxane segments in the structure of a resin does not make it possible to expect good results in connection with the absorption of a water-based ink. It is however known that the surface of a film made of a resin having a low siloxane content is fully covered by the siloxane component in a dry state but, when dipped in water or the like, the resin shows a phenomenon that the siloxane component is buried within the resin, in other words, the resin has environmental responsibility [Kobunshi Ronbunshu (Collected Papers on Polymers), 48[4], 227 (1991); etc.].

In the first aspect of the present invention, this phenomenon is used. The adequate control of the siloxane content in the resin has made it possible to provide an ink-jet recording sheet which, upon being printed with a water-based ink, shows hydrophilicity on a surface thereof owing to environmental responsibility, thereby exhibiting excellent absorbency for the water-based ink, permitting formation of well-defined ink dots, assuring excellent color-producing ability for the ink and hence providing stable printed marks of high quality and which, during and after drying, is covered at the surface thereof by the siloxane component, thereby showing excellent transportability, blocking resistance, waterproofness and moisture resistance.

According to the second aspect of the present invention, on the other hand, the use of the hydrophilic resin has made it possible to form the ink-receiving layer in a porous form. The ink-receiving layer is therefore provided with higher water absorbency for a water-based ink owing to capillary phenomenon, thereby furnishing an ink-jet recording sheet which exhibits excellent absorbency for the water-based ink, permits formation of well-defined ink dots, assures excellent color-producing ability for the ink and hence provides stable printed marks of high quality and which is also excellent in properties such as transportability and blocking resistance.

DETAILED DESCRIPTION OF THE INVENTION AND PREFERRED EMBODIMENTS

The ink-jet recording sheet according to the first aspect of the present invention is characterized in that the resin component, which constitutes the ink-receiving layer, contains siloxane segments in its molecule. Usable as this resin is a hydrophilic polyurethane resin, hydrophilic polyurea resin, hydrophilic polyurethane-polyurea resin or hydrophilic polyamide resin, which contains siloxane segments.

In the ink-jet recording sheet according to the second aspect of the present invention, the ink-receiving layer is formed of a porous hydrophilic polyurethane resin, porous hydrophilic polyurea resin or porous hydrophilic polyurethane-polyurea resin.

A polysiloxane compound usable for the introduction of polysiloxane segments into the resin, which constitutes the ink-receiving layer in the first aspect of the present invention, contains one or more reactive groups, for example, amino, epoxy, hydroxyl, mercapto, carboxyl or like groups in a molecule. Preferred examples of the polysiloxane compound containing such reactive groups can include the following compounds:

(1) Amino-modified polysiloxane compounds

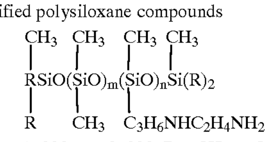

(m = 1–200, n = 2–200, R = $CH_3$ or $OCH_3$)

-continued

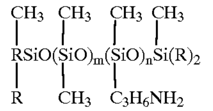

(m = 1–200, n = 2–200, R = $CH_3$ or $OCH_3$)

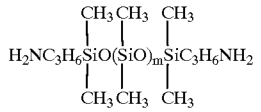

(m = 1–300)

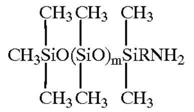

(m = 1–300, R = lower alkylene)

(2) Epoxy-modified siloxane compounds

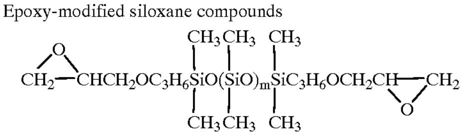

(m = 1–300)

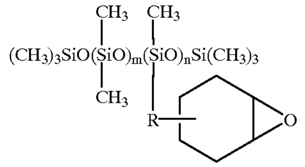

(m = 1–200, n = 2–200, R = lower alkylene)

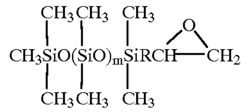

(m = 1–300, R = lower alkylene)

(3) Alcohol-modified siloxane compounds

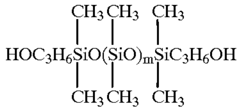

(m = 1–300)

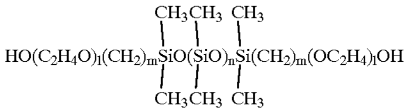

(l = 1–300, m = 2–6, n = 1–300)

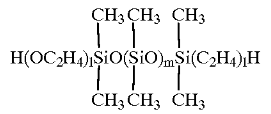

(l = 1–300, m = 1–300)

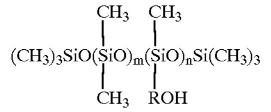

(m = 1–200, n = 2–200, R = lower alkylene)

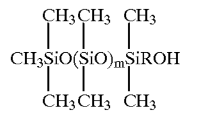

(m = 1–300, R = lower alkylene)

-continued

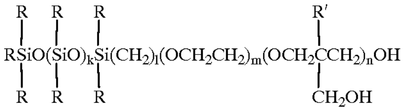

($R = CH_3$ or $OCH_3$, $R' = H$ or alkyl, $k = 1–300$, $l = 0–5$, $m = 0–50$, $n = 1–3$)

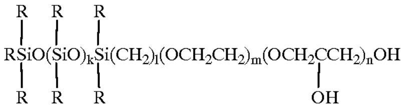

($R = CH_3$ or $OCH_3$, $k = 1–300$, $l = 0–5$, $m = 0–50$, $n = 1–3$)

(4) Mercapto-modified siloxane compounds

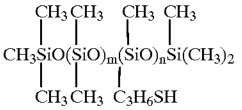

($m = 1–200$, $n = 2–200$)

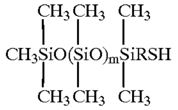

($m = 1–300$, R = lower alkylene)

(5) Carboxyl-modified siloxane compounds

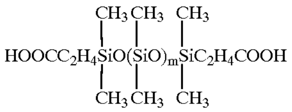

($m = 1–300$)

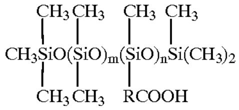

($m = 1–200$, $n = 2–200$, R = lower alkylene)

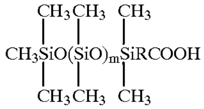

($m = 1–300$, R = lower alkylene)

The above-listed polysiloxane compounds, which contain the reactive organic functional groups, are examples of compounds preferred for use in the present invention, so that the present invention should not be limited to the use of these exemplified compounds.

Accordingly, not only the above-exemplified compounds but also those commercially sold these days and readily available from the market are all usable in the present invention.

The hydrophilic polyurethane resin, hydrophilic polyurea resin, hydrophilic polyurethane-polyurea resin or hydrophilic polyamide resin, which contains the above-described polysiloxane compound as constituent segments, can be obtained by a method known per se in the art.

A more specific description will now be made about preferable ones among these methods. It is a compound containing hydroxyl or amino groups as end groups and having a molecular weight in a range of from 200 to 800 that is preferred for obtaining the hydrophilic polyurethane resin, hydrophilic polyurea resin, hydrophilic polyurethane-polyurea resin or hydrophilic polyamide resin through a reaction with the above-described polysiloxane compound.

Illustrative of a compound containing hydroxyl groups as end groups and having hydrophilicity are:

polyethylene glycol, copolymerized polyol of polyethylene glycol and polytetramethylene glycol, copolymerized polyol of polyethylene glycol and polypropylene glycol, polyethylene glycol adipate, polyethylene glycol succinate, copolymerized polyol of polyethylene glycol and poly-$\epsilon$-caprolactone, and copolymerized polyol of polyethylene glycol and poly-$\gamma$-valerolactone.

Illustrative of a compound containing amino groups as end groups and having hydrophilicity are:

polyethylene oxide diamine, polyethylene oxide propylene oxide diamine, polyethylene oxide triamine, and polyethylene oxide propylene oxide triamine.

It is however to be noted that another polyol or polyamine containing no hydrophilic chains can also be used in combination upon production of the resin in order to impart waterproofness.

As an organic isocyanate to be reacted with the above-described polyol and/or polyamine, any organic isocyanate known to date can be used. Needless to say, it is also possible to use a urethane prepolymer or the like which is available by reacting such an organic polyisocyanate with a polyol or polyamine of a lower molecular weight to form end isocyanate groups. As a chain extender, any low-molecular dithiol, low-molecular amine or the like known to date is usable.

The preferable molecular weight of the hydrophilic polyurethane resin, hydrophilic polyurea resin, hydrophilic polyurethane-polyurea resin or hydrophilic polyamide resin, which is obtained from such materials as described above and contains siloxane segments in its molecule, is from 10,000 to 500,000, with a molecular weight of from 20,000 to 200,000 being most preferred. These resins can be produced either in a solventless manner or in an organic solvent. From the standpoint of production steps, production of the resin in an organic solvent which is usable upon formation of the ink-receiving layer is advantageous because the resulting resin solution can be used as is.

The polysiloxane segments in the resin may be contained in either side chains (pendants) or a backbone. As the content of the polysiloxane segments, it is preferred that the polysiloxane segments are contained in such a proportion as accounting for 0.1 to 10 parts by weight in 100 parts by weight of the resin.

If the content of the polysiloxane segments in the resin is smaller than 0.1 part by weight, the good surface properties—such as waterproofness, high running property and transportability—of the recording sheet, the attainment of which is an objective of the present invention, cannot be fully brought about. On the other hand, a content of polysiloxane segments higher than 10 parts by weight leads to stronger water repellency and hence to deteriorations in the absorbency of a water-based ink and the quality of printed marks. Contents of polysiloxane segments outside the above range are therefore not preferred.

In the ink-jet recording sheet according to the second aspect of the present invention, the ink-receiving layer is formed from the porous hydrophilic polyurethane resin, porous hydrophilic polyurea resin or porous hydrophilic polyurethane-polyurea resin. These resins can be obtained following methods known per se in the art.

A more specific description will next be made about preferred ones among these resins. The hydrophilic polyurethane resin, hydrophilic polyurea resin or hydrophilic polyurethane-polyurea resin can be obtained by reacting a polyol and/or polyamine, which is the same as that described in connection with the first aspect, with a polyisocyanate, which is the same as that described in connection with the first aspect, while using the same chain extender as that described in connection with the first aspect as needed.

It is however to be noted that, upon synthesis of the hydrophilic polyurethane resin, hydrophilic polyurea resin or hydrophilic polyurethane-polyurea resin, another polyol or polyamine, a silicone polyol, a perfluoroalkyl polyol and/or the like which do not contain hydrophilic groups can also be copolymerized to impart waterproofness to an ink-receiving layer to be formed.

The preferable molecular weight of the hydrophilic polyurethane resin, hydrophilic polyurea resin or hydrophilic polyurethane-polyurea resin, which is obtained from such materials, is from 10,000 to 500,000, with a molecular weight of from 20,000 to 200,000 being most preferred.

As a method for obtaining the porous ink-receiving layer in the present invention, it is mentioned to prepare a coating formulation of the above-described hydrophilic polyurethane resin, hydrophilic polyurea resin or hydrophilic polyurethane-polyurea resin and then to apply the coating formulation on a base material to form a film. For the preparation of the coating formulation of the above-described resin and the subsequent formation of the ink-receiving layer, the following methods can be mentioned as typical examples.

(1) The resin is emulsified in a form of o/w or w/o, and the resulting emulsion is coated on a base material sheet to form a film.

(2) The resin is provided with a portion soluble in an organic solvent and a portion insoluble in said organic solvent. By making use of this solubility difference in the organic solvent, the resin is formulated into a dispersion, which is then coated on a base material sheet to form a film.

(3) A solution of the resin in an organic solvent, which has compatibility with water, is coated on a base material sheet, and the base material sheet is then dipped in water to eliminate the solvent.

(4) A dispersion of the resin, another resin and an additive is prepared. The dispersion is coated on a base material sheet to form a film. The another resin and additive are then selectively eliminated.

(5) A film is formed from the resin with an inorganic filler dispersed therein. The film is then stretched into a porous sheet, which is then bonded to a base material sheet.

Methods other than the above-described methods can also be applied to the present invention insofar as porous ink-receiving layers can be obtained.

Usable examples of the base material sheets in the ink-jet recording sheets according to the present invention can include paper sheets, plastic films, glass sheets, fabrics, wood sheets, and metal sheets. Exemplary paper sheets can include high-quality paper sheets (i.e., wood-free paper sheets), medium-quality paper sheets (i.e., paper sheets made of at least 70% of chemical pump and the remainder of groundwood pulp), coated paper sheets, and cast-coated paper sheets.

Illustrative of plastic films can be polyester, cellulose triacetate, polycarbonate, poly(vinyl chloride), polypropylene, polyamide, polystyrene, polyethylene and poly(methyl methacrylate) sheets of 50–250 μm in thickness.

If necessary, a primer layer can be formed to provide adhesion to the base material sheet; or an anti-curling layer or a lubricant layer, which improves the coefficient of friction, can be applied to the back side of the base material sheet, said back side being on the side of a non-receiving layer.

As the resin component constituting the ink-receiving layer, the resin in the first aspect or the resin in the second aspect can be used singly. Depending on the composition of an ink-jet recording ink, a water-soluble polymer may also be used in combination with the above-described resin with a view to additionally imparting hydrophilicity and/or water absorbency or to adjusting the same.

Usable examples of the water-soluble polymer can include polyvinyl alcohol, modified polyvinyl alcohol, hydroxyethylcellulose, CMC, cellulose derivatives, polyvinylpyrrolidone, starch, cationized starch, gelatin, casein, and acrylic acid polymers.

Further, a hydrophobic polymer may also be used in combination with the above-described resin with a view to further imparting waterproofness and durability to the ink-receiving layer and printed marks. Usable examples of the hydrophobic polymer can include commonly-used synthetic resins such as polyester resins, poly(vinyl chloride) resin, polystyrene resin, poly(methyl methacrylate) resin, polycarbonate resins, polyurethane resins, vinyl chloride-vinyl acetate copolymer resins, acrylonitrile-styrene copolymer resins, polyvinyl butyral resin, polyamide resins, epoxy resins, urea resins, and melamine resins.

Moreover, inorganic or organic pigments and resin particles can also be incorporated in the ink-receiving layer in order to improve the ink absorbency, ink-setting property and ink-color-producing ability of the ink-receiving layer and also the blocking resistance and waterproofness of the ink-receiving layer.

As pigments and resin particles for use in the ink-receiving layer, one or more pigments and resin particles can be suitably chosen in accordance with the quality design of the ink-jet recording sheet from known pigments and resin particles, for example, mineral or porous pigments—such as kaolin, delaminated kaolin, aluminum hydroxide, silica, diatomaceous earth, calcium carbonate, talc, titanium oxide, calcium sulfate, barium sulfate, zinc oxide, alumina, calcium silicate, magnesium silicate, colloidal silica, zeolite, bentonite, sericite and lithopone; and fine particles, porous fine particles, hollow particles and the like of polystyrene resin, urea resins, acrylic resins, melamine resins, benzoguanamine resin, polyurethane resins, and other organic pigments. In this case, these pigments and resin particles are added in a range of from 0 to 95 wt. %, preferably from 10 to 90 wt. % based on the whole solid content of the ink-receiving layer.

Besides the resin and pigments, various additives can also be incorporated in the ink-receiving layer as needed. These additives can include thickening agents, parting agents, penetrating agents, wetting agents, thermal gelling agents, sizing agents, defoaming agents, foam suppressors, blowing agents, coloring matters, fluorescent whiteners, ultraviolet absorbers, oxidation inhibitors, quenchers, antiseptic agents, antistatic agents, crosslinking agents, dispersants, lubricants, plasticizers, pH regulators, flow improvers, setting promoters, and waterproofing agents.

The hydrophilic polyurethane resin, hydrophilic polyurea resin, hydrophilic polyurethane-polyurea resin or hydrophilic polyamide resin, which has siloxane segments in the molecule thereof and is used in the first aspect of the present invention, is dissolved by itself or together with another resin in an organic solvent or water, to which the above-described pigments, resin particles and various additives are added to prepare a coating formulation. This coating formulation is then applied by gravure coating, direct or reverse roll coating, wire bar coating, air knife coating, curtain coating, blade coating, rod coating, die coating or a like coating method. After the coating, the thus-coated layer is finished by using a calender such as a machine calender, supercalender or soft calender.

The thickness of the ink-receiving layer formed as described above may preferably be from 0.5 to 50 g/m$^2$ in terms of dry weight, with 3 to 20 g/m$^2$ or so being more preferred. If the thickness of the ink-receiving layer is smaller than 1 g/m$^2$, the ink-receiving layer cannot exhibit sufficient ink absorbency. Even if the thickness exceeds 50 g/m$^2$, no additional effects are available. Accordingly, such an excessively large thickness is not economical and, moreover, tends to induce fold-cracking, curling and the like of the ink-receiving layer.

The ink-jet recording sheet according to the second aspect of the present invention can be obtained by either coating or bonding the porous ink-receiving layer on the base material sheet in accordance with the manner of formation of the ink-receiving layer. The thickness of the porous ink-receiving layer to be formed may preferably be from 1 to 2,000 $\mu$m. A thickness smaller than 1 $\mu$m results in insufficient ink absorption, thereby making it impossible to obtain printed marks of high quality. On the other hand, a thickness greater than 2,000 $\mu$m tends to develop problems such as a reduction in print density and occurrence of fold-cracking and curling of the ink-receiving layer.

The present invention will next be described more specifically by the following Referential Examples, Examples and Comparative Examples, in which all the designations of "part" or "parts" and "%" are by weight.

FIRST ASPECT

Referential Example 1

Synthesis of Polyurethane Resin

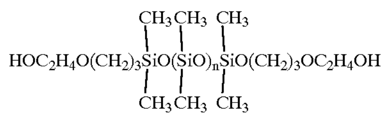

Eight (8) parts of a polydimethylsiloxanepolyol having the above-described structure (molecular weight: 3,200), 142 parts of polyethylene glycol and 8 parts of ethylene glycol were dissolved in a mixed solvent consisting of 250 parts of methyl ethyl ketone and 145 parts of dimethylformamide. While thoroughly stirring the solution at 60° C., a solution of 52 parts of hydrogenated MDI in 100 parts of methyl ethyl ketone was gradually added dropwise. After completion of the dropwise addition, they were reacted at 80° C. for 6 hours so that a polyurethane resin solution was obtained. This solution had a viscosity of 550 dPa.s (25° C.) at a solid content of 35%. The breaking strength, breaking extension and softening point of a film formed from the solution were 24.5 MPa, 450% and 105° C., respectively.

Referential Example 2

(Synthesis of polyurea resin)

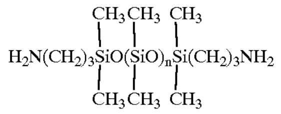

Five (5) parts of a polydimethylsiloxanediamine

Five (5) parts of a polydimethylsiloxanediamine having the above-described structure (molecular weight: 3,880), 145 parts of polyethylene oxide diamine ("Jeffermin ED", trade name; product of Texaco Chemical Inc.; molecular weight: 2,000) and 8 parts of propylenediamine were dissolved in 280 parts of dimethylformamide. While thoroughly stirring the solution with its internal temperature controlled within a range of from 0 to −5° C., a solution of 47 parts of hydrogenated MDI in 100 parts of dimethylformamide was gradually added dropwise to react them. After completion of the dropwise addition, the internal temperature was gradually raised. When 50° C. was reached, they were reacted further for 5 hours so that a polyurea resin solution was obtained. This solution had a viscosity of 550 dPa.s (25° C.) at a solid content of 35%. The breaking strength, breaking extension and softening point of a film formed from the solution were 27.6 MPa, 310% and 145° C., respectively.

Referential Example 3

Synthesis of Polyurethane-polyurea Resin

Five (5) parts of the polydimethylsiloxanediamine (molecular weight: 3,880) of Referential Example 2, 145 parts of polyethylene glycol (molecular weight: 2,040) and 8 pats of 1,3-butylene glycol were dissolved in a mixed solvent consisting of 74 parts of toluene and 197 parts of methyl ethyl ketone. While thoroughly stirring the solution at 60° C., a solution of 42 parts of hydrogenated MDI in 100 parts of methyl ethyl ketone was gradually added dropwise. After completion of the dropwise addition, they were reacted at 80° C. for 6 hours so that a polyurethane-polyurea resin solution was obtained. This solution had a viscosity of 200 dPa.s (25° C.) at a solid content of 35%. The breaking strength, breaking extension and softening point of a film formed from the solution were 14.7 MPa, 450% and 90° C., respectively.

Referential Example 4

Synthesis of Polyamide Resin

To a solution of 14.6 parts of adipic acid in 200 parts of anhydrous ethanol, a solution of 11.6 parts of the polydimethylsiloxanediamine of Referential Example 2 and 19.4 parts of polyethylene oxide diamine (molecular weight: 2,000) in 100 parts of anhydrous ethanol was added dropwise at room temperature. After exotherm subsided, the reaction mixture was cooled, whereby a nylon salt was allowed to precipitate. After the nylon salt was collected by filtration and dried, 160 parts of the nylon salt were dissolved in 40 parts of water. The resulting solution was placed in an autoclave. The autoclave was purged with nitrogen gas, and its valve was closed. When the internal temperature and pressure reached 220° C. and 1.5 MPa, respectively, the valve was opened to release water vapor. Heating was continued while maintaining the pressure. Polycondensation was conducted for 4 hours and, after that, the internal pressure was allowed to slowly drop to atmospheric pressure. After cooling, the reaction product was taken out and dissolved in N-methyl-2-pyrrolidone. This solution had a viscosity of 50 dPa.s (25° C.) at a solid content of 30%. The breaking strength, breaking extension and softening point of a film formed from the solution were 7.8 MPa, 150% and 140° C., respectively.

Referential Example 5

A polyurethane resin solution was obtained using the same materials and formula as in Referential Example 1 except that the polydimethylsiloxanepolyol was not used. This solution had a viscosity of 500 dPa.s (25° C.) at a solid content of 35%. The breaking strength, breaking extension and softening point of a film formed from the solution were 26.5 MPa, 400% and 106° C., respectively.

Referential Example 6

A polyurea resin solution was obtained using the same materials and formula as in Referential Example 2 except that the polydimethylsiloxanediamine was not used. This solution had a viscosity of 300 dPa.s (25° C.) at a solid content of 35%. The breaking strength, breaking extension and softening point of a film formed from the solution were 28.0 MPa, 300% and 147° C., respectively.

Referential Example 7

A polyurethane-polyurea resin solution was obtained using the same materials and formula as in Referential Example 3 except that the polydimethylsiloxanediamine was not used. This solution had a viscosity of 220 dPa.s (25° C.) at a solid content of 35%. The breaking strength, breaking extension and softening point of a film formed from the solution were 15.0 MPa, 430% and 88° C., respectively.

Referential Example 8

A polyamide resin solution was obtained using the same materials and formula as in Referential Example 4 except that the polydimethylsiloxanediamine was not used. This solution had a viscosity of 55 dPa.s (25° C.) at a solid content of 30%. The breaking strength, breaking extension and softening point of a film formed from the solution were 8.0 MPa, 130% and 138° C., respectively.

Examples 1–4

In each Example, 40 parts of the resin obtained in the corresponding one of Referential Examples 1–4, 100 parts of fine particulate synthetic amorphous silica (BET specific surface area: 300 $m^2/g$, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15% to provide a coating formulation. The coating formulation was applied by an air knife coater on a wood-free paper sheet having a basis weight of 35 $g/m^2$ to give a solid coat weight of 10 $g/m^2$, and was then dried. The thus-coated paper sheet was supercalendered under a linear pressure of 200 Kg/cm to form an ink-receiving layer, whereby a recording sheet according to the present invention was obtained.

Comparative Examples 1–4

In each Comparative Example, 40 parts of the resin obtained in the corresponding one of Referential Examples 5–8, 100 parts of fine particulate synthetic amorphous silica (BET specific surface area: 300 $m^2/g$, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15% to provide a coating formulation. The coating formulation was applied by an air knife coater on a wood-free paper sheet having a basis weight of 35 $g/m^2$ to give a solid coat weight of 10 $g/m^2$, and was then dried. The thus-coated paper sheet was supercalendered under a linear pressure of 200 Kg/cm to form an ink-receiving layer, whereby a recording sheet according to the Comparative Example was obtained.

Using the eight (8) sheets obtained as described above, printing or recording was conducted with four colors of yellow, magenta, cyan and black on an ink-jet printer which was designed to perform printing or recording with inks of water-soluble dyes. The following properties were ranked. The results are presented in Table 1.

Ink Absorbency

Ink absorbency was ranked by counting the number of seconds required until printed inks dried.

A: 5 seconds or shorter.

B: 6 to 10 seconds.

C: 11 seconds or longer.

Vividness of Produced Colors

The vividness of produced colors was ranked by printing a color mark on the above-described printer and then visually observing the color vividness of the thus-obtained color mark.

A: Good

B: Average

C: Poor

Blotting Resistance

Blotting resistance was ranked by visually observing the extents of ink blotting and bleeding at an overprinted boundary area of magenta and cyan.

A: Good

B: Average

C: Poor

Waterproofness of Ink-receiving Layer

Each ink-receiving layer was wetted with water. The waterproofness of the ink-receiving layer was ranked in terms of the state of separation of the ink-receiving layer when the water was wiped off under constant finger pressure.

A: No separation.

B: Slightly separated.

C: Separated.

Waterproofness of Printed Mark

After printing each recording sheet on the printer, the recording sheet was dipped in water (for 10 minutes), and the recording sheet was then dried at room temperature. The waterproofness of the printed mark was ranked by visually observing any changes in the blotting and color quality of the recorded mark.

A: No change.

B: Slightly changed.

C: Changed.

Blocking Resistance

The blocking resistance of each recording sheet was ranked after an untreated PET film was left over on the ink-receiving layer of the recording sheet under 0.29 MPa load at 40° C. for 1 days.

A: No blocking.
B: Slight blocking.
C: Severe blocking.

Printer Transportability

The printer transportability of each recording sheet upon printing or recording it on the ink-jet printer was ranked.

A: Good transportability.
B: Slight noise was produced.
C: Poor transportability.

TABLE 1

| | Example | | | | Comparative Example | | | |
|---|---|---|---|---|---|---|---|---|
| | 1 | 2 | 3 | 4 | 1 | 2 | 3 | 4 |
| Ink absorbency | B | A | A | A | A | A | A | A |
| Vividness of produced color | A | A | A | A | A | A | A | A |
| Blotting resistance | A | A | A | A | A | A | A | A |
| Waterproofness of ink-receiving layer | A | A | A | A | B | B | B | B |
| Waterproofness of printed mark | A | A | A | A | B | B | B | B |
| Blocking resistance | A | A | A | A | C | B | C | B |
| Printer transport-ability | A | A | A | A | B | B | C | B |

SECOND ASPECT

Example 1

Production Method Involving Emulsification: O/W Type

Hydrogenated MDI (76 parts) was added to a mixture of 70 parts of polytetramethylene glycol (molecular weight: 1,970), 230 parts of polyethylene glycol (molecular weight: 2,040) and 2 parts of trimethylolpropane. They were reacted at 90° C. for 5 hours, whereby an end-isocyanated prepolymer was obtained. As a result of a quantitative analysis of free isocyanate groups in the reaction product, the quantity of the free isocyanate groups was found to be 2.44% although the calculated value was 2.65%.

To 100 parts of the thus-obtained prepolymer, 30 parts of toluene and 2 parts of a surfactant ("Emulgen", trade mark; product of Kao Corporation). After the prepolymer was evenly dissolved, an aqueous solution of 3.4 parts of isophoronediamine in 30 parts of water was slowly added while stirring the prepolymer solution at room temperature (24° C.) and a speed as high as about 6,000 rpm. After completion of the addition, 370 parts of water were added under high-speed stirring in a homomixer, whereby a milky white dispersion of a polyurethane-polyurea resin having an average molecular weight of about 120,000 was obtained.

One (1) part of an anionic foam stabilizer (product of San Nopco Limited) was added to 100 parts of the dispersion. The resulting mixture was stirred in a homomixer to prepare a dispersion with uniform air bubbles formed therein. The dispersion was coated by a bar coater on a synthetic paper sheet having a thickness of 80 $\mu$m ("Yupo FPG-80", trade name; product of Oji-Yuka Synthetic Paper Co., Ltd.) to give a solid coat weight of 30 g/m$^2$. The thus-coated dispersion was then dried, whereby an ink-jet recording sheet of the present invention having a uniform porous ink-receiving layer was obtained.

Example 2

Production Method Involving Emulsification: W/O Type

Fifty (50) parts of polytetramethylene glycol (molecular weight: 1,020), 150 parts of polyethylene glycol (molecular weight: 2,040) and 6 parts of ethylene glycol were dissolved in 350 parts of methyl ethyl ketone, followed by the addition of 54 parts of diphenylmethane diisocyanate under thorough stirring at 70° C. After completion of the addition, 257 parts of methyl ethyl ketone were added further. They were then reacted at 80° C. for 6 hours, whereby a solution of a polyurethane resin having an average molecular weight of 98,000 was obtained. The solid content of the solution was 30%.

Next, 16 parts of a urethane-base emulsifier and 172 parts of toluene were added to the solution. Under high-speed stirring in a homomixer, 690 parts of water were added so that a polyurethane resin dispersion of a milky white color was obtained. The dispersion was coated by a bar coater on a synthetic paper sheet having a thickness of 80 $\mu$m ("Yupo FPG-80", trade name; product of Oji-Yuka Synthetic Paper Co., Ltd.) to give a solid coat weight of 30 g/m$^2$. The thus-coated dispersion was then dried first at 60° C. and then at 130° C., whereby an ink-jet recording sheet of the present invention having a uniform porous ink-receiving layer was obtained.

Example 3

Production Method Making Use of a Difference in Solubility

Two hundred (200) parts of polyethylene glycol (molecular weight: 2,040) and 15 parts of 1,4-butanediol were dissolved in a mixture of 250 parts of toluene and 250 parts of methyl ethyl ketone, followed by the addition of 66 parts of diphenylmethane diisocyanate under through stirring at 70° C. After completion of the addition, 340 parts of methyl ethyl ketone were added further, followed by a reaction at 80° C. for 6 hours. The reaction mixture progressively turned to a milky white color as the reaction proceeded. Thereafter, the reaction mixture was allowed to cool down to room temperature under stirring, whereby a milky-white polyurethane resin solution having a solid content of 25% and containing fine particles of 1 to 3 $\mu$m evenly dispersed therein was obtained. In a similar manner as in Example 1, this solution was coated to give a solid coat weight of 30 g/m$^2$ and the thus-coated solution was dried. An ink-jet recording sheet of the present invention having a uniform porous ink-receiving layer was obtained.

Example 4

Production Method Making Use of the Water Dipping Method

Two hundred (200) parts of polyethylene oxide ("Jeffermin ED", trade name; product of Texaco Chemical Inc.; molecular weight: 2,000) and 10 parts of propylenediamine were dissolved in 350 parts of dimethylformamide. Under thorough stirring with the internal temperature controlled within a range of from 0 to 5° C., a solution of 61 parts of hydrogenated MDI in 280 parts of dimethylformamide was slowly added dropwise to react them. After completion of the dropwise addition, the internal temperature was gradually raised. When internal temperature reached 50° C., they were reacted further for 5 hours so that a pale-yellow, clear solution of a polyurea resin having an average molecular weight of 120,000 was obtained. The solid content of the solution was 30%. In a similar manner as in Example 1, the solution was coated by a bar coater on a synthetic paper sheet to give a solid coat weight of 30 g/m$^2$. The thus-coated synthetic paper sheet was dipped in a bath of a 1:1 mixture of dimethylformamide and water controlled at 40° C. and then dried, whereby an ink-jet recording sheet of the present invention having a uniform porous ink-receiving layer was obtained.

Example 5

Forty (40) parts of polytetramethylene glycol (molecular weight: 1,020), 160 parts of polyethylene glycol (molecular weight: 2,040), 8 parts of 1,4-butanediol and 52 parts of diphenylmethane diisocyanate were subjected to bulk polymerization. Thirty-five (35) parts of the resultant thermoplastic polyurethane resin having an average molecular weight of 78,000 and 65 parts of stearyl alcohol were continuously extruded through a T die (width: 400 mm, die gap: 1 mm) while kneading them at 190° C. in an extruder having a barrel diameter of 35 mm, whereby a sheet of 80 μm in thickness was obtained. The thus-obtained sheet was dipped in a 3:7 mixture of water and dimethylformamide to remove stearyl alcohol from the sheet. The sheet was then bonded to a synthetic paper sheet with a polyester-base adhesive ("Nichigo Polyester", trade name; product of The Nippon Synthetic Chemical Industry Co., Ltd.). They were subjected on one side thereof to heat treatment by heating rollers the surface temperature of which was controlled at 130° C., whereby an ink-jet recording sheet of the present invention having a uniform porous ink-receiving layer of 30 μm in thickness was obtained.

Comparative Example 1

An ink-jet recording sheet with a transparent ink-receiving layer formed thereon was obtained by coating a polyurethane-polyurea resin dispersion, which had been obtained in accordance with the same formula as in Example 1, on a synthetic paper sheet without formation of air bubbles and then drying the thus-coated dispersion under conditions of 130° C./2 minutes.

Comparative Example 2

A pale-yellow, clear solution of a polyurethane resin was obtained in a similar manner as in Example 3 except that the solvent, methyl ethyl ketone, was replaced by dimethylformamide.

This solution was coated on a synthetic paper sheet and then dried, whereby an ink-jet recording sheet with a transparent ink-receiving layer formed thereon was obtained.

Comparative Example 3

The polyurea resin solution of Example 4 was coated on a synthetic paper sheet. The thus-coated solution was then dried as was at 130° C. for 3 minutes without dipping it in the dimethylformamide/water bath, whereby an ink-jet recording sheet with a transparent ink-receiving layer formed thereon was obtained.

Comparative Example 4

The thermoplastic polyurethane resin, which had been obtained by the bulk polymerization in Example 5, was processed through the T-die without adding stearyl alcohol. The thus-prepared sheet was bonded to a synthetic paper sheet, whereby an ink-jet recording sheet with a transparent ink-receiving layer formed thereon was obtained.

Using the nine (9) sheets obtained as described above, printing or recording was performed in a similar manner as in the first aspect. Their properties were ranked likewise. The results are presented in Table 2.

TABLE 2

| | Example | | | | | Comparative Example | | | |
|---|---|---|---|---|---|---|---|---|---|
| | 1 | 2 | 3 | 4 | 5 | 1 | 2 | 3 | 4 |
| Blocking resistance | B | A | A | A | A | C | B | B | B |
| Printer transportability | A | A | A | A | A | C | B | B | B |
| Ink absorbency | A | A | A | A | A | B | A | A | B |
| Vividness of produced color | A | A | A | A | A | B | B | B | B |
| Blotting resistance | A | A | A | A | A | B | B | B | B |
| Waterproofness of ink-receiving layer | A | A | A | A | A | B | B | C | B |

As has been described above, the ink-jet recording sheet according to the first aspect of the present invention—which uses, as the resin component constituting its ink-receiving layer, the hydrophilic polyurethane resin, hydrophilic polyurea resin, hydrophilic polyurethane-polyurea resin and/or hydrophilic polyamide resin having siloxane segments in the molecule thereof—is excellent in ink absorbency and color-producing ability, provides stable printed marks of high quality, and is also superb in the transportability, blocking resistance, waterproofness and moisture resistance of the ink-receiving layer and in the waterproofness and moisture resistance of printed marks.

The ink-jet recording sheet according to the second aspect of the present invention—the ink-receiving layer of which has been formed from the porous hydrophilic polyurethane resin, the porous hydrophilic polyurea resin or the porous polyurethane-polyurea resin—is excellent in ink absorbency and color-producing ability, provides stable printed marks of high quality, and is also superb in the transportability, blocking resistance, waterproofness and moisture resistance of the ink-receiving layer and in the waterproofness and moisture resistance of printed marks.

What is claimed is:

1. An ink-jet recording sheet provided with at least one ink-receiving layer on at least one side of a base material sheet, wherein a resin component which constitutes said ink-receiving layer comprises a hydrophilic resin selected from the group consisting of hydrophilic polyurethane resin, hydrophilic polyurea resin, hydrophilic polyurethane-polyurea resin and hydrophilic polyamide resin, wherein the hydrophilic resin has water-repellant siloxane segments in a molecule thereof, wherein said siloxane segments account for 0.1 to 10 parts by weight in 100 parts by weight of said hydrophilic resin, and wherein said hydrophilic resin is derived from at least one compound containing terminal hydroxyl or amino groups and containing polyethylene oxide groups.

2. An ink-jet recording sheet according to claim 1, wherein said resin component comprises a hydrophilic polyurethane resin having siloxane segments in a molecule thereof and formed of polydimethylsiloxanediol, polyethylene glycol and a diisocyanate.

3. An ink-jet recording sheet according to claim 1, wherein said resin component comprises a hydrophilic polyurea resin having siloxane segments in a molecule thereof and formed of polydimethylsiloxanediamine, polyethylene oxide diamine and a diisocyanate.

4. An ink-jet recording sheet according to claim 1, wherein said resin component comprises a hydrophilic polyurethane-polyurea resin having siloxane segments in a molecule thereof and formed of polydimethylsiloxanediamine, polyethylene glycol and a diisocyanate.

5. An ink-jet recording sheet according to claim 1, wherein said resin component comprises a hydrophilic polyamide resin having siloxane segments in a molecule thereof and formed of a dicarboxylic acid, polydimethylsiloxanediamine and polyethylene oxide diamine.

6. An ink-jet recording sheet provided with at least one ink-receiving layer on at least one side of a base sheet, wherein said ink-receiving layer comprises a porous hydrophilic resin selected from the group consisting of hydrophilic polyurethane resin, a hydrophilic polyurea resin and a hydrophilic polyurethane-polyurea resin wherein the hydrophilic resin has water-repellant siloxane segments in a molecule thereof, wherein said siloxane segments account for 0.1 to 10 parts by weight in 100 parts by weight of said hydrophilic resin, and wherein said hydrophilic resin is derived from at least one compound containing terminal hvdroxyl or amino groups and containing polyethylene oxide groups.

7. An ink-jet recording sheet according to claim 6, wherein said ink-receiving layer has been formed by emulsifying said resin and then coating the resulting emulsion on a base material sheet to form a film.

8. An ink-jet recording sheet according to claim 6, wherein said resin has a portion soluble in an organic solvent and a portion insoluble in said organic solvent, and said ink-receiving layer has been formed from a dispersion of said resin in said organic solvent.

9. An ink-jet recording sheet according to claim 6, wherein said ink-receiving layer has been formed by coating a solution of said resin in an organic solvent, which has compatibility with water, on a base material sheet and then dipping said base material sheet in water to eliminate said organic solvent.

10. An ink-jet recording sheet according to claim 6, wherein said ink-receiving layer has been formed by coating a dispersion of said resin, another resin and an additive on a base material sheet to form a film and then selectively eliminating said another resin and additive.

* * * * *